(12) United States Patent
Noba

(10) Patent No.: US 7,896,499 B2
(45) Date of Patent: Mar. 1, 2011

(54) MOBILE PHONE

(75) Inventor: Koya Noba, Fujiyoshida (JP)

(73) Assignee: Citizen Electronics Co., Ltd., Fujiyoshida-shi, Yamanashi-ken (JP)

( * ) Notice: Subject to any disclaimer, the term of this patent is extended or adjusted under 35 U.S.C. 154(b) by 964 days.

(21) Appl. No.: 11/801,485

(22) Filed: May 10, 2007

(65) Prior Publication Data

US 2007/0275752 A1    Nov. 29, 2007

(30) Foreign Application Priority Data

May 11, 2006    (JP) ................. 2006-132322

(51) Int. Cl.
G03B 21/26 (2006.01)
H01J 5/02 (2006.01)
H04M 1/00 (2006.01)

(52) U.S. Cl. .......... 353/28; 250/239; 455/556.1

(58) Field of Classification Search ........... 353/39, 353/46, 119, 122, 30–34, 28; 455/550.1, 455/556.1, 566, 575.1, 575.3, 899; 345/1.1, 345/32, 205; 359/204.1–204.5; 348/744, 348/789, 836, 838, 14.16, 14.01, 373, 376
See application file for complete search history.

(56) References Cited

U.S. PATENT DOCUMENTS

| | | | |
|---|---|---|---|
| 5,751,383 A | 5/1998 | Yamanaka | |
| 5,867,795 A * | 2/1999 | Novis et al. | 455/566 |
| 5,971,545 A * | 10/1999 | Haitz | 353/31 |
| 6,491,395 B2 * | 12/2002 | Shirakura et al. | 353/7 |
| 6,547,400 B1 | 4/2003 | Yokoyama | |
| 7,110,052 B1 * | 9/2006 | Faris et al. | 349/5 |
| 7,484,850 B2 * | 2/2009 | Sakata et al. | 353/20 |
| 2006/0209374 A1 | 9/2006 | Willemsen | |

FOREIGN PATENT DOCUMENTS

JP    7-58814 A    3/1995

(Continued)

OTHER PUBLICATIONS

Japanese Office Action issued Mar. 26, 2010 for Japanese Application No. 2006-132322 with translation (3 pages).
Noba, U.S. Patent Application entitled "Mobile Phone", U.S. Appl. No. 11/731,804, filed Mar. 30, 2007.
Office Action from co-pending U.S. Appl. No. 11/731,804, dated Mar. 16, 2010, 19 pages.

Primary Examiner — Que T Le
Assistant Examiner — Jennifer Bennett
(74) Attorney, Agent, or Firm — Brinks Hofer Gilson & Lione

(57) ABSTRACT

An image projection mechanism of a mobile phone has a light source section for image projection, a light modulator and a projection lens. The light source section has an LED device including an LED element having a luminous wavelength in a red color region, an LED element having a luminous wavelength in a green color region, and an LED element having a luminous wavelength in a blue color region, which are provided in one package, and a lens that converts light emitted from the LED device into substantially parallel rays. The three LED elements of the LED device are turned on and off sequentially, and the light modulator is operated synchronously with the sequential turning on-off of the LED elements, thereby projecting an image displayed on the light modulator as a multicolor image through the projection lens.

16 Claims, 8 Drawing Sheets

FOREIGN PATENT DOCUMENTS

| | | | |
|---|---|---|---|
| JP | 2001-313702 A | | 11/2001 |
| JP | 2001313702 A | * | 11/2001 |
| JP | 2004-317871 | | 11/2004 |
| JP | 2004-317871 A | | 11/2004 |
| JP | 2004317871 A | * | 11/2004 |
| JP | 2005-191838 | | 7/2005 |
| WO | WO2006/013522 A2 | | 2/2006 |

* cited by examiner

MOBILE PHONE

This application claims priority under 35 U.S.C. §119 to Japanese Patent Application No. JP2006-132322 filed May 11, 2006, the entire content of which is hereby incorporated by reference.

BACKGROUND OF THE INVENTION

1. Field of the Invention

The present invention relates to mobile phones and, more particularly, to a mobile phone having an image projection function.

2. Description of the Related Art

Japanese Patent Application Publication No. 2004-317871, for example, discloses a mobile phone 10 having an image projection mechanism as shown in FIG. 16. When image projection is to be performed with the mobile phone 10, a transmissive liquid crystal display 12 is pivoted about a pivot shaft 14 so as to erect on a body casing 10a, and an arm 20 is pivoted about a pivot shaft 18 to erect a light source lamp 16. Further, the luminous intensity of the light source lamp 16 is switched to a high level by a control unit to project an image displayed on the transmissive liquid crystal display 12 onto a screen 1. The transmissive liquid crystal display 12 is provided with a reverse video display device to display a reversed image of a normally displayed image or data.

When image projection is not performed, the transmissive liquid crystal display 12, together with a diffuser 24, is flattened onto the surface of the body casing 10a, and the light source lamp 16 is also housed in the body casing 10a. The light source lamp 16 is used as a backlight for the transmissive liquid crystal display 12.

The above-described image projection mechanism, however, uses no projection lens. Therefore, the projected image can appear sharp only on the screen 1 placed in close proximity to the transmissive liquid crystal display 12.

When a transmissive liquid crystal display provided with color filters is used to obtain a color projected image, a beautiful color projected image cannot be obtained because of the low light transmittance of the color filters even if the light intensity of the light source lamp 16 is increased. This disadvantage, in combination with the above-described problem, causes the color projected image to become blurred.

In addition, a relatively large display panel of the mobile phone is formed by using a transmissive liquid crystal display, and an image displayed on the transmissive liquid crystal display is projected. Therefore, light from the light source lamp 16 needs to be applied in a wide angle. Consequently, there occurs light that does not contribute to the image projection. Thus, the light utilization efficiency degrades.

As the light intensity of the light source lamp 16 is increased, the electric power consumption increases, and the battery life of the mobile phone reduces correspondingly. Accordingly, image projection cannot be performed for a long period of time.

Further, the arm 20 as erected makes it difficult to operate an operation panel installed near the arm 20. It is also likely that a user's fingertip may block the rays of projection light during the operation of the operation panel with the fingertip.

SUMMARY OF THE INVENTION

Accordingly, an object of the present invention is to provide a mobile phone having an image projection function that is free from the above-described problems with the related art.

The present invention provides a mobile phone with an image projection function that includes a light source section for image projection, a light modulator, and a projection lens. The light source section includes a light-emitting diode device having three different kinds of light-emitting diode elements provided in one package. The light-emitting diode elements have different luminous wavelengths from each other. The light source section further includes a lens that collects light emitted from the light-emitting diode device and directs the light toward the light modulator. The three different kinds of light-emitting diode elements turn on and off sequentially, and the light modulator operates synchronously with the sequential flickers of the light-emitting diode elements, thereby projecting a multicolor image.

In this mobile phone, three different luminescent colors can be obtained with a single light-emitting diode device. Therefore, the light source section can be constructed in a compact form. Because light-emitting diodes have the properties that they are compact and bright and require minimum electric power to operate, the light-emitting diode device is suitable for use in the mobile phone as a light source section for image projection. The lens provided in the light source section collects light emitted from a single light-emitting diode device to use it for image projection. Therefore, the light utilization efficiency can be increased, and the brightness of the projected image can be increased. Accordingly, a clear projected image can be obtained. Further, because the field-sequential color method is used to form a multicolor image, it is possible to obtain an image brighter than in the case of the above-described system using color filters.

In the above-described mobile phone, the light modulator may be a liquid crystal display panel, and the light source section may have a polarization converter that converts polarization of light emitted from the lens to conform to a polarization property of the light modulator. Light emitted from the light-emitting diode device has various polarized light components such as a p-polarized light component (p wave) and an s-polarized light component (s wave). Only a polarized light component of one vibration direction can enter the transmissive liquid crystal display panel serving as the light modulator. Therefore, of the light emitted from the light-emitting diode device, which is composed of p-polarized light rays and s-polarized light rays, the p-polarized light rays, for example, are converted into s-polarized light rays and transmitted through the polarization converter. Meanwhile, the s-polarized light rays of the light from the light-emitting diode device are transmitted through the polarization converter as they are. Thus, the light rays from the light-emitting diode device are all allowed to pass through and exit the polarization converter as s-polarized light rays and enter the transmissive liquid crystal display panel. With this arrangement, the light utilization efficiency can be doubled. Further, because the liquid crystal display panel can be driven at a low voltage, the power consumption is minimized. Thus, the liquid crystal display panel can be driven for a long period of time in the mobile phone. The liquid crystal display panel is thin in thickness and hence enables a compact image projection mechanism to be implemented without impairing the portability of the mobile phone. Further, because the liquid crystal display panel is built to the specifications of transmissive liquid crystal display panels, a high light transmittance can be obtained, and it is possible to obtain a multicolor projected image sufficiently visible under the conditions of image display based on the field-sequential color method.

The lens may be a condenser lens that condenses light emitted from the light-emitting diode device into substantially parallel rays. With this arrangement, divergence of light can be eliminated, and it becomes possible to utilize light effectively. Specifically, the polarization converter comprises a polarization beam splitter and a phase difference plate. The polarization converter is provided at the rear of the condenser lens in the light source section. Thus, substantially parallel rays formed through the condenser lens enter the polarization converter comprising a polarization beam splitter, and hence it is possible to minimize the amount of light lost in the polarization beam splitter. The substantially parallel rays formed through the condenser lens remain as substantially parallel rays even after passing through the polarization converter and, in this state, enter the transmissive liquid crystal display panel serving as the light modulator. From the transmissive liquid crystal display panel, projection image light emanate to enter the projection lens. Because substantially parallel rays enter the transmissive liquid crystal display panel, divergence of projection image light rays exiting the panel is minimized, and hence it becomes possible to minimize the diameter of the projection lens. Thus, the projection lens can be mounted on the mobile phone without impairing portability.

In the above-described mobile phone, the light-emitting diode device may include a light-emitting diode element having a luminous wavelength in a red color region, a light-emitting diode element having a luminous wavelength in a green color region, and a light-emitting diode element having a luminous wavelength in a blue color region, which are provided in one package.

The luminescent colors in the red, green and blue color regions are three primary colors commonly named "R, G and B". If the three light-emitting diode elements are simultaneously turned on to emit their luminescent colors, a luminescent color in a white color region can be obtained. It is also possible to obtain a full-color projected image by using the luminescent colors R, G and B.

In the above-described mobile phone, the condenser lens may be a Fresnel lens. A sheet-shaped Fresnel lens is available. With such a Fresnel lens, the light source section can be constructed in a compact form.

Specifically, the mobile phone may be arranged as follows. The mobile phone includes a first housing member having a first surface, a second surface opposite to the first surface, and an end surface extending between the first surface and the second surface. The first housing member has a main display panel on the first surface. The mobile phone further includes a second housing member having a first surface, a second surface opposite to the first surface, and an end surface extending between the first surface and the second surface. The second housing member has an operation panel on the first surface. The first housing member is pivotally attached to the second housing member such that the end surface of the first housing member is adjacent to the end surface of the second housing member. The first housing member is displaceable between a folded position where the first surface thereof abuts against the first surface of the second housing member and an unfolded position where the first surface of the first housing member is separate from the first surface of the second housing member. The unfolded position is reached when the first housing member is pivoted from the folded position. The light source section is attached to the end surface of the second housing member to emit light in a direction away from the second housing member and in substantially parallel to the first and second surfaces of the second housing member. The light modulator and the projection lens are attached to the first housing member and adapted to be erectable on the second surface thereof when the first housing member is placed in the unfolded position so that the light-receiving surface of the light modulator is substantially perpendicular to the optical axis of light from the light source section and the optical axis of the projection lens is substantially on the same line as the optical axis of light from the light source section.

Because parallel rays are used, the light modulator only needs to be on the extension of the optical axis of light from the light source section. There is no restriction on the light modulator's position on the extension of the optical axis of light from the light source section. Accordingly, the light modulator has the freedom that it can be mounted at any position on the first housing member on the extension of the optical axis of light from the light source section. If the light-receiving surface of the light modulator is placed at substantially right angles to the optical axis of light from the light source section, variation in modulation of image light rays emanating from the light modulator can be minimized, and it is possible to obtain projection light of an image having the same configuration as that of the image displayed on the light modulator. Further, if the projection lens is positioned so that the optical axis thereof is substantially on the same line as the optical axis of light from the light source section, the projected image is free from distortion or the like, and it is possible to obtain on the screen an enlarged projected image having the same configuration as that of the image displayed on the transmissive liquid crystal display panel.

Image projection is performed with the first housing member placed in the unfolded position. In the unfolded position, the main display panel on the first housing member and the operation panel on the second housing member appear on the front side of the mobile phone. Therefore, the operation panel can be operated freely to perform image projection. If the transmissive liquid crystal display panel is arranged so that the same display image as on the main display panel appears on this panel, the user can operate the operation panel while viewing the image on the main display panel. Accordingly, the mobile phone has excellent operability in performing the projection operation. In addition, the operation panel can be operated without any influence on the projected image. Further, the transmissive liquid crystal display panel as the light modulator and the projection lens are foldable. Therefore, when the projection operation is not performed, the light modulator and the projection lens are collapsed and accommodated within the first housing member, and the first housing member is folded. Thus, the light modulator and the projection lens do not substantially impair the portability of the mobile phone.

In this case, the projection lens may be adapted to be attachable and detachable with respect to the second surface of the first housing member, A high-performance projection lens is needed in order to obtain an enlarged projected image that is clear and sharp over the entire image area. Such a projection lens is unavoidably large in size. A plurality of lens elements may need to be used in combination as a projection lens for that purpose. It is currently difficult to accommodate such a projection lens in the mobile phone. Therefore, the projection lens used in the present invention is preferably formed in an easily attachable and detachable structure. When the projection operation is to be performed, the projection lens is attached to the first housing member. When image projection is not performed, the projection lens is detached from the first housing member. With this arrangement, the projection lens has no influence on the portability of the mobile phone.

The light modulator may serve also as a sub-display panel for the mobile phone that is provided on the second surface of the first housing member. With this arrangement, the light modulator can be implemented without the need to provide an additional component, and the production cost can be reduced.

The above-described mobile phone may be arranged as follows. The second housing member is adapted to be set in a mobile phone battery charger to receive electric power therefrom, so that if the first housing member is placed in the unfolded position and the second housing member is set in the mobile phone battery charger, it is possible to perform image projection while operating the operation panel on the second housing member and receiving electric power from the battery charger.

By supplying electric power to the mobile phone from the mobile phone battery charger, image projection can be performed for a long period of time. Accordingly, the mobile phone can be used as a conference projector or a home projector.

The above and other objects, features and advantages of the present invention will become more apparent from the following description of the preferred embodiments thereof, taken in conjunction with the accompanying drawings.

DESCRIPTION OF PREFERRED EMBODIMENTS

First, an image projection mechanism for use in a mobile phone according to a first embodiment of the present invention will be described with reference to FIGS. 1 to 3.

Figure 1:
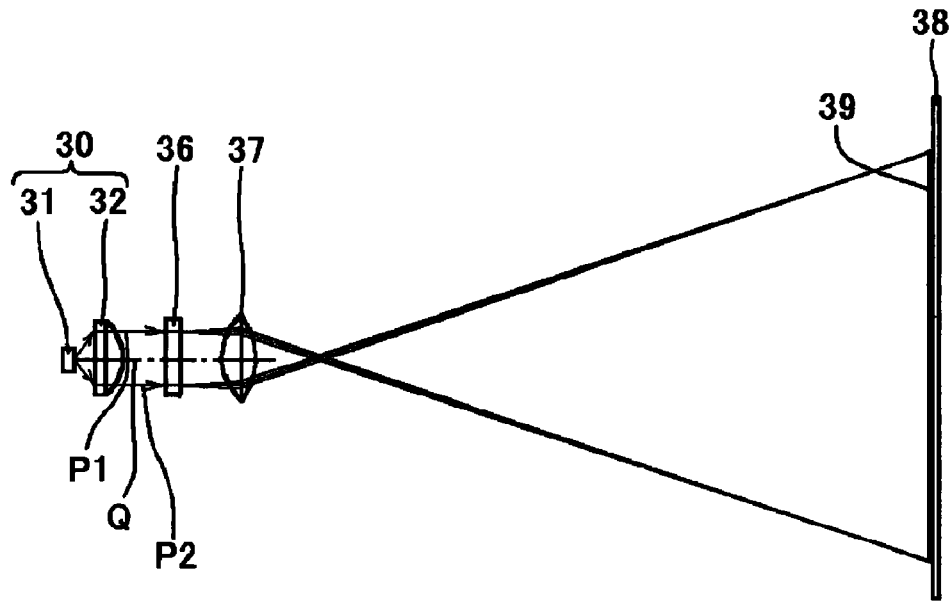
FIG. 1 is a schematic diagram showing an image projection mechanism for use in a mobile phone according to a first embodiment of the present invention.

In FIG. 1, a light source section 30 comprises an LED (light-emitting diode) device 31 and a lens 32. The LED device 31 has three different kinds of LED elements provided in one package. The LED elements have different luminous wavelengths from each other. The three different kinds of LED elements are an LED element having a luminous wavelength in a red color region (hereinafter referred to as "LED element R"), an LED element having a luminous wavelength in a green color region (hereinafter referred to as "LED element G"), and an LED element having a luminous wavelength in a blue color region (hereinafter referred to as "LED element B"). The LED elements R, G and B are arranged to turn on in the sequence of R→G→B with a time period of 5 ms or less per LED element. The LED elements R, G and B turn on and off repeatedly in a cycle of R→G→B.

The lens 32 comprises a condenser lens that condenses light emitted from the LED device 31 into substantially parallel rays. As shown in FIG. 1, light emitted from the LED device 31 enters the condenser lens, and substantially parallel rays (only parallel rays P1 and P2 are shown in FIG. 1) exit the condenser lens. The condenser lens is used herein for the purpose of increasing the light utilization efficiency. Therefore, in view of the use application, the desired function can be attained even if the condenser lens is inferior in surface roughness or other accuracy to a projection lens used to project and form an image. A plurality of lenses need to be used to collect light with a high accuracy of parallelism of rays, resulting in an increased size of the structure of the light source section 30. In the present invention, the desired purpose can be attained, provided that rays that are substantially parallel to each other can be obtained. Therefore, light rays exiting the lens 32 are expressed as "substantially parallel rays". Although the first embodiment uses a convex lens as the condenser lens, a Fresnel lens is also usable. If a sheet-shaped Fresnel lens is used, the light source section 30 can be further downsized.

Figure 2:
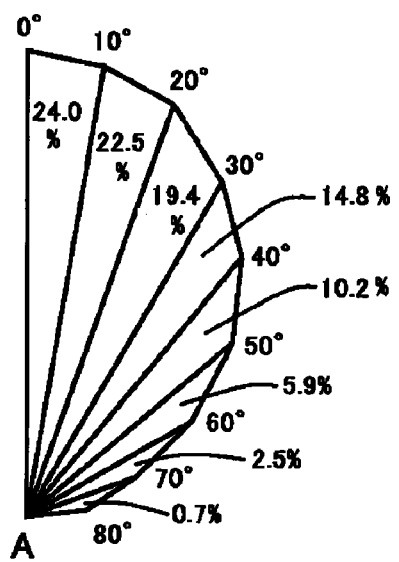
FIG. 2 is a characteristic chart showing directional characteristics of an ordinary light-emitting diode.

The LED device 31 has directional characteristics as shown in FIG. 2. In FIG. 2, point A is an emission center, and line A-0° represents a center optical axis. It will be seen from FIG. 2 that 24.0% of light is distributed in a region extending through an angle of 10° from the optical axis, and not less than 96% of light is distributed in a region extending through an angle of 60° from the optical axis. In the first embodiment, light in a region extending through an angle of less than 60° from the optical axis is arranged to enter the lens 32 to utilize not less than 96% of the intensity of light emitted from the LED device 31.

The planar dimension of the condenser lens is preferably set appropriately in view of the area and resolution of a display image obtained by the light modulator (described later) and also portability, although it depends on the size of the light modulator. The size of the condenser lens in the first embodiment is minimized within the range in which portability is not impaired and yet a satisfactory resolution can be obtained for the image displayed on the light modulator.

In this embodiment, the LED device 31 is used to perform light-emission drive, and hence low-voltage drive can be attained. Because the power consumption is low, the projection operation can be performed for an increased period of time. In addition, the light source section 30 is formed by using the LED device 31 and the lens 32, whereby a high light utilization efficiency can be achieved, and a bright (strong light intensity) projected image can be obtained. Further, because the LED device 31 has LED elements R, G and B, three different luminescent colors can be obtained with a single LED device. Because the light source section 30 can be integrally made of the single LED device 31 and the single lens 32, the light source section 30 can be configured small and compact and hence can be mounted in a mobile phone without impairing portability.

Reference numeral 36 in FIG. 1 denotes the above-described light modulator. The light modulator 36 displays an image by utilizing the modulation of light. The light modulator 36 in the first embodiment comprises a transmissive liquid crystal display panel. Reference numeral 37 denotes a projection lens.

Figure 3:
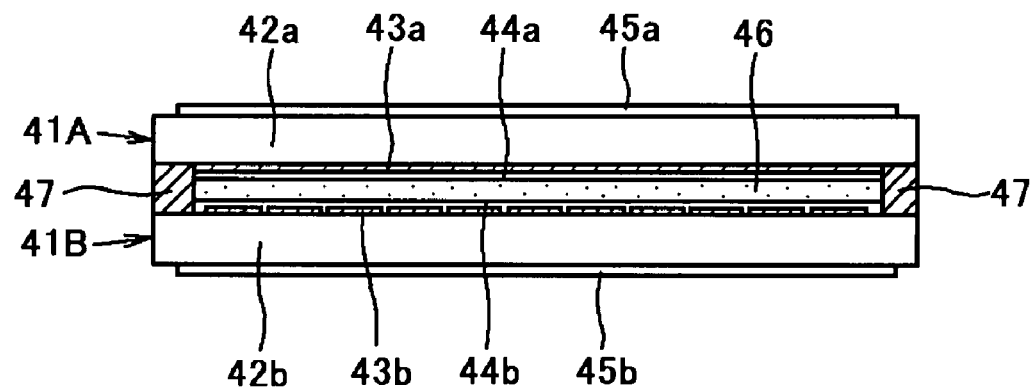
FIG. 3 is a sectional view of a transmissive liquid crystal display panel, which is a light modulator shown in FIG. 1.

The transmissive liquid crystal display panel serving as the light modulator 36 has, as shown in FIG. 3, an upper substrate 41A and a lower substrate 41B opposed to each other across a gap of several μm (4 to 5 μm). A liquid crystal 46 is sealed in the gap with a sealer 47, and polarizing plates 45a and 45b are provided respectively on the upper surface of the upper substrate 41A and the lower surface of the lower substrate 41B. The upper substrate 41A comprises a transparent substrate 42a of a transparent glass material or the like. A transparent counter electrode 43a made of an ITO (indium tin oxide) film is provided on the transparent substrate 42a, and an alignment layer 44a is provided over the counter electrode 43a. The lower substrate 41B comprises a transparent substrate 42b of a transparent glass material or the like. A plurality of transparent pixel electrodes 43b made of an ITO film are provided on the transparent substrate 42b, and an alignment layer 44b is provided over the pixel electrodes 43b. The pixel electrodes 43b each have a rectangular shape and are arrayed in a matrix on the lower substrate 41B. Each pixel electrode 43b is provided with a TFT (thin-film transistor). In other words, the transmissive liquid crystal display panel is an active matrix liquid crystal display panel using TFTs. Each pixel electrode 43b provided with a TFT forms one pixel, and a large number of pixels in combination form an image.

The liquid crystal 46 used herein may be an STN liquid crystal, a ferroelectric liquid crystal, or a TN liquid crystal having a low viscosity. An STN liquid crystal is operated in normally black mode in which it blocks transmission of light when no voltage is applied thereto, but when a voltage is applied thereto, the liquid crystal becomes transparent to transmit light. For a TFT panel, normally white mode is employed in which the liquid crystal is operated to transmit light when no voltage is applied thereto but to block transmission of light when a voltage is applied thereto in a reverse relation to the normally black mode.

The pixel electrodes 43b of the transmissive liquid crystal display panel are driven synchronously with the light-emission drive of the three different kinds of LED elements R, G and B of the LED device 31. For example, when the LED element R is on, pixel electrodes 43b for red color component are activated to make the liquid crystal 46 transparent, thereby allowing red light of the LED element R to pass through the liquid crystal display panel. Similarly, when the LED element G is on, pixel electrodes 43b for green color component are activated to make the liquid crystal 46 transparent, thereby allowing green light of the LED element G to pass through the liquid crystal panel. When the LED element B is on, pixel electrodes 43b for blue color component are activated to make the liquid crystal 46 transparent, thereby allowing blue light of the LED element B to pass through the liquid crystal panel. The LED elements R, G and B are repeatedly turned on in the sequence of R→G→B with a time period of 5 ms or less per LED element, thereby effecting color mixing temporally to obtain a multicolor display image. In this embodiment, the color image is projected to obtain a color projected image. A bright projected image can be obtained by performing image projection based on the field-sequential color method as stated above. It is possible to obtain a color projected image several times as bright as a color image projected from a liquid crystal display panel using color filters. Moreover, the colors of the projected image appear clear and brilliant.

Further, because the transmissive liquid crystal display panel can be driven at a low voltage, the power consumption is minimized. The transmissive liquid crystal display panel can be driven satisfactorily by a battery for a mobile phone.

In FIG. 1, the transmissive liquid crystal display panel serving as the light modulator 36 is preferably installed so that the light-receiving surface thereof is substantially perpendicular to the optical axis Q of light from the light source section 30 (in FIG. 1, the optical axis Q is shown by an alternate long and short dash line). The transmissive liquid crystal display panel is positioned so that substantially parallel rays from the light source section 30 are incident on the entire image display area of the panel. By placing the light-receiving surface at substantially right angles to the optical axis Q, variation in light modulation at the transmissive liquid crystal display panel can be minimized, and divergence of light exiting the panel can be minimized. Parallel rays incident on the light-receiving surface of the transmissive liquid crystal display panel emerge from the exit surface of the panel as substantially parallel rays of light with minimum divergence. Thus, it is possible to obtain, from emerging light from the transmissive liquid crystal display panel, projection light of an image having the same configuration as that of the image displayed on the panel. In addition, the projection lens 37 provided behind the transmissive liquid crystal display panel can be reduced in size. There is no particular restriction on the distance between the light source section 30 and the transmissive liquid crystal display panel because parallel rays are used. The transmissive liquid crystal display panel can be positioned appropriately in accordance with the structure and so forth of each particular mobile phone.

The projection lens 37 is preferably positioned so that the optical axis thereof is substantially on the same line as the optical axis Q of light from the light source section 30. By so doing, the projected image is allowed to be free from distortion or the like, and it is possible to obtain an enlarged projected image having the same configuration as that of the image displayed on the transmissive liquid crystal display panel. The projection lens 37 can be reduced in size by using parallel rays as projection rays. Thus, the projection lens 37 can be made compact to be mounted in a mobile phone.

In FIG. 1, reference numeral 38 denotes a screen, and reference numeral 39 denotes an image projected on the screen 38. In the light source section 30, light emitted from the LED device 31 is converted into substantially parallel rays through the lens 32. Thus, substantially parallel rays exit the light source section 30 and enter the light modulator 36 comprising a transmissive liquid crystal display panel. Projection light of a color display image formed by the field-sequential color method emerges from the transmissive liquid crystal display panel. The projection light enters the projection lens 37, and a brightly visible color image 39 enlarged through the projection lens 37 is projected on the screen 38.

The image projection mechanism arranged as stated above is compact in size and therefore can be mounted in a mobile phone and allows image projection to be performed with minimum power consumption. The image projection mechanism can be constructed from a reduced number of components, i.e. the LED device 31, the lens 32 comprising a condenser lens, the light modulator 36 comprising a transmissive liquid crystal display panel, and the projection lens 37. Therefore, costs can be reduced.

In addition, the LED device 31 has a characteristic property that the on-off response time is fast, in addition to the characteristic properties that the structure is compact, and that the power consumption is low, and further that the luminance is high. In this embodiment, an image projection mechanism based on the field-sequential color method is constructed by utilizing the characteristic property of the LED device 31 that the response time is fast, and used in a mobile phone, thereby making it possible to form a brightly visible multicolor projected image.

Figure 4:
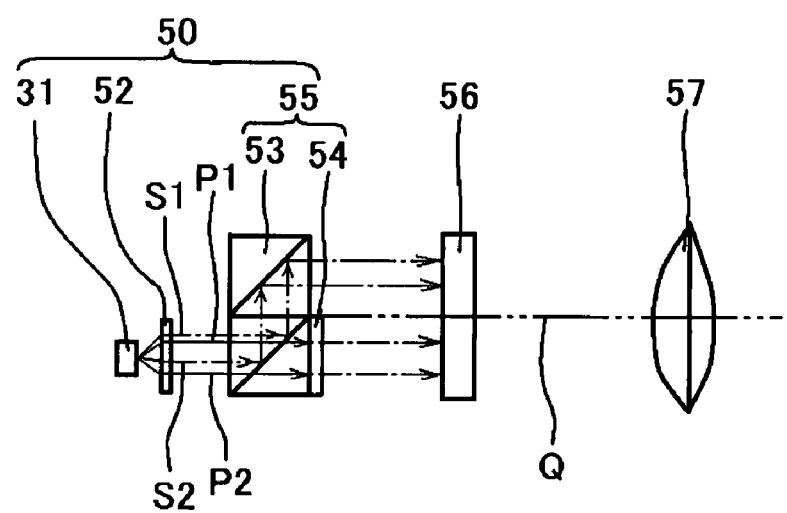
FIG. 4 is a schematic diagram showing an image projection mechanism for use in a mobile phone according to a second embodiment of the present invention.

Next, an image projection mechanism for use in a mobile phone according to a second embodiment of the present invention will be described with reference to FIG. 4. FIG. 4 is a schematic diagram showing the image projection mechanism for use in the mobile phone according to the second embodiment of the present invention.

A light source section 50 in the second embodiment comprises an LED device 31, a lens 52, and a polarization converter 55. The LED device 31 used in this embodiment is of the same specifications as the LED device 31 used in the above-described first embodiment. That is, the LED device 31 has three different kinds of LED elements R, G and B provided in one package. The LED elements R, G and B turn on and off in the sequence of R→G→B. The lens 52 comprises a condenser lens that condenses light emitted from the LED device 31 into substantially parallel rays. As the condenser lens, a Fresnel lens is used in the second embodiment. It is a sheet-shaped Fresnel lens having a concentric ring-shaped lens configuration. The Fresnel lens serving as the lens 52 is positioned where not less than 96% of the intensity of light emitted from the LED device 31 can be utilized.

The polarization converter 55 comprises a polarization beam splitter (hereinafter referred to as "PBS") 53 and a phase difference plate 54. In FIG. 4, the lens 52 and the polarization converter 55 are depicted as being separate from each other for facilitating understanding but may be placed in contact with each other. The LED device 31 emits light having polarized light components such as a p-polarized light component (p wave) and an s-polarized light component (s wave). In FIG. 4, p-polarized light rays are indicated by P1 and P2 (depicted by two solid lines), and s-polarized light rays are indicated by S1 and S2 (depicted by two alternate long and short dash lines). Further, the p-polarized light rays P1 and P2 and the s-polarized light rays S1 and S2 are shown at separate positions for the sake of easier explanation.

P-polarized light rays (P1 and P2) and s-polarized light rays (S1 and S2) that are made substantially parallel to each other by the lens 52 comprising a Fresnel lens enter the PBS 53. Of the incident light rays, the p-polarized light rays (P1 and P2) pass through a reflector provided in the PBS 53 and enter the phase difference plate 54. As the phase difference plate 54, a half-wave plate is used. The phase difference plate 54 converts p-polarized light rays into s-polarized light rays. Thus, s-polarized light rays exit the phase difference plate 54. Meanwhile, the s-polarized light rays (S1 and S2) entering the PBS 53 are reflected by the reflector in the PBS 53 to exit the PBS 53 while remaining as s-polarized light rays, along a crank-shaped light travel path. Thus, the p- and s-polarized light rays emitted from the LED device 31 are all allowed to pass through and exit the polarization converter 55 as s-polarized light rays and enter a light modulator 56 as substantially parallel rays.

The reflector in the PBS 53 has been optimized so as to perform the desired operation when light is incident thereon at an angle of 45°. In other words, the reflector effectively acts on light perpendicularly incident on the entrance surface of the PBS 53. The perpendicularly incident light is a beam of parallel rays that are parallel to the center optical axis of the LED device 31. Directional characteristics of an ordinary LED are such that only 24% of the whole light is distributed in a region extending through an angle of 10° from the optical axis of the LED, as shown in FIG. 2. If light emitted from the LED device 31 enters the PBS 53 as it is without being condensed, the reflector in the PBS 53 does not function optimally. In addition, light emitted from the LED device 31 at a large angle to the optical axis thereof undergoes generally unpredictable internal reflection in the PBS 53, resulting in an increased amount of light being lost in the PBS 53. In this embodiment, the lens 52 comprising a Fresnel lens is disposed between the LED device 31 and the PBS 53 to condense light emitted from the LED device 31 into substantially parallel rays, so that parallel rays from the lens 52 enter the PBS 53. The parallel rays from the lens 52 are incident at an angle of 45° on the reflector in the PBS 53.

The light modulator 56 comprises a transmissive liquid crystal display panel of the same specifications as that used in the first embodiment. That is, the light modulator 56 is an active matrix transmissive liquid crystal display panel using TFTs, which performs image projection based on the field-sequential color method in which the pixel electrodes of the transmissive liquid crystal display panel are driven synchronously with the light-emission drive of the LED elements R, G and B of the LED device 31 in the sequence of R→G→B. A polarizing plate provided on the transmissive liquid crystal display panel is installed such that the vibration direction thereof is the same direction as that of s-polarized light so that s-polarized light rays exiting from the polarization converter 55 pass therethrough. With this arrangement, almost all light emitted from the LED device 31 can pass through the transmissive liquid crystal display panel, and the light utilization efficiency can be doubled.

In FIG. 4, the alternate long and two short dashes line Q represents the optical axis of light from the light source section 50. The transmissive liquid crystal display panel serving as the light modulator 56 is preferably positioned so that the light-receiving surface thereof is substantially perpendicular to the optical axis Q of light from the light source section 50. There is no particular restriction on the distance between the light source section 50 and the transmissive liquid crystal display panel because parallel rays are used. The transmissive liquid crystal display panel can be positioned appropriately in accordance with the structure and so forth of each particular mobile phone.

The projection lens 57 is preferably positioned so that the optical axis thereof is substantially on the same line as the optical axis Q of light from the light source section 50. By so doing, the projected image is allowed to be free from distortion or the like, and it is possible to obtain an enlarged projected image having the same configuration as that of the image displayed on the transmissive liquid crystal display panel.

As has been stated above, the light source section 50 in the second embodiment comprises the LED device 31, the lens 52 and the polarization converter 55, which are arranged in the order mentioned, thereby allowing almost all light emitted from the LED device 31 to enter the light modulator 56 comprising a transmissive liquid crystal display panel as projection light. The provision of the polarization converter 55 doubles the light utilization efficiency and effectively allows the projected image to appear even brighter than in the case where no polarization converter 55 is provided, provided that the size of the projected image is the same.

Next, a mobile phone according to a third embodiment of the present invention will be described with reference to FIGS. 5 to 9.

Figure 5:
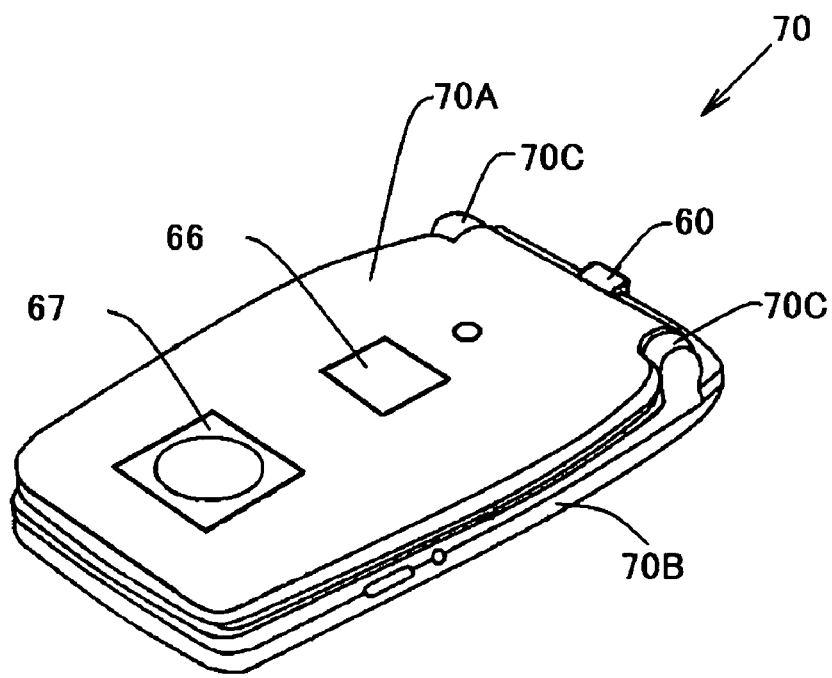
FIG. 5 is a perspective view of a mobile phone according to a third embodiment of the present invention, showing the mobile phone as folded.
Figure 6:
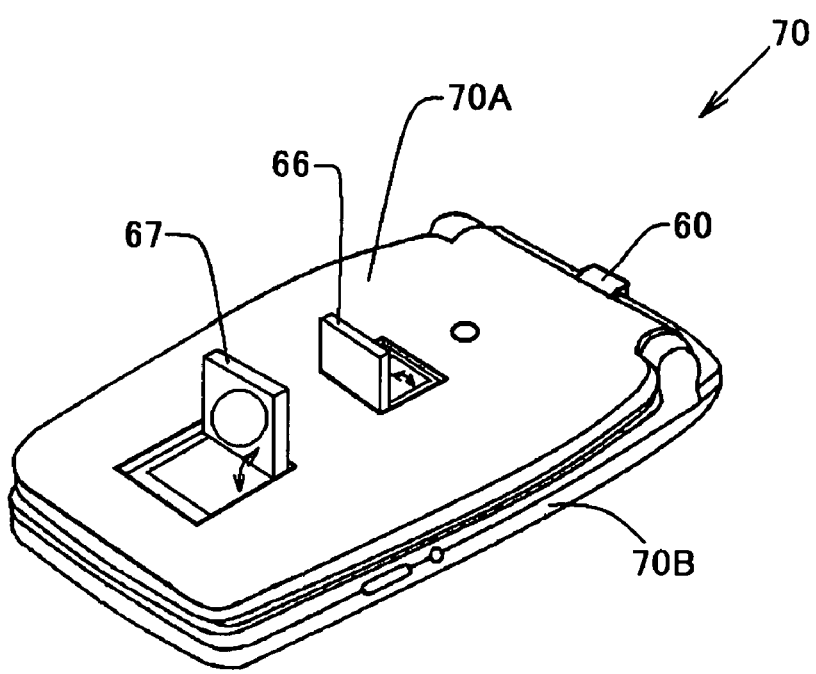
FIG. 6 is a perspective view of the mobile phone in FIG. 5, showing a state where a light modulator and a projection lens have been set in respective image projection positions.
Figure 7:
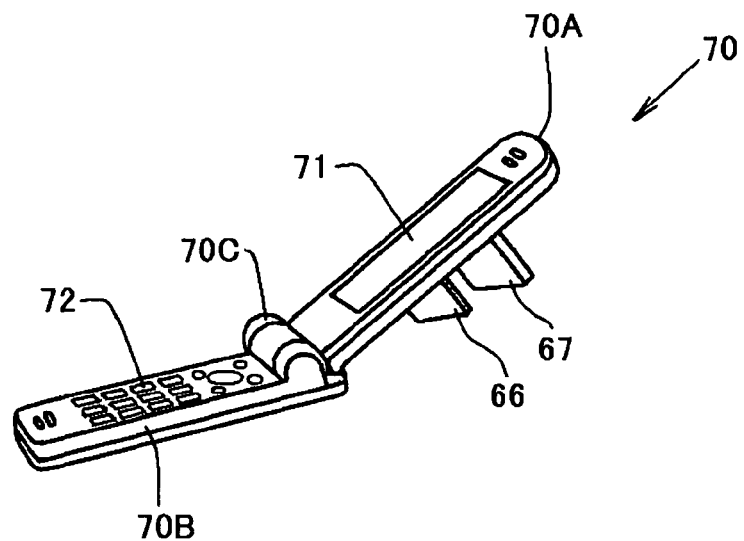
FIG. 7 is a perspective view of the mobile phone in FIG. 6, when it is unfolded.

As shown in FIGS. 5 and 6, a mobile phone 70 of the third embodiment is a foldable mobile phone having a first housing member 70A and a second housing member 70B that are pivotable through a hinge 70C. When the mobile phone 70 is unfolded as shown in FIG. 7, a main display panel 71 provided on the first housing member 70A appears on the front side of the mobile phone. The main display panel 71 displays various kinds of information. The second housing member 70B has an operation panel 72 through which the user performs reception and transmission operations, an image display switching operation, an information input operation, etc. As shown in FIGS. 5 and 6, the second housing member 70B is provided with a light source section 60 near the hinge 70C. The light source section 60 is provided with an LED device and so forth.

As shown in FIG. 5, a light modulator 66 and a projection lens 67 are pivotably mounted on the first housing member 70A. The side of the first housing member 70A on which the light modulator 66 and the projection lens 67 are mounted is opposite to the side thereof on which the main display panel 71 is provided.

FIG. 6 shows the light modulator 66 and the projection lens 67 that have been pivoted. As shown in FIG. 6, the light modulator 66 and the projection lens 67 are adapted to be erected outward as shown by the arrows and fixedly supported in the respective erected positions.

The projection lens 67 comprises a lens accommodated in a holder casing. The projection lens 67 is movable in its erected position within a small range forward or backward along the optical axis of the light source section 60 (described later) and also forward or backward with respect to the display surface of the light modulator 66 to focus the projected image.

An image displayed on the light modulator 66 is projected by light from the light source section 60 and enlarged by the projection lens 67. When image projection is not performed, the light modulator 66 and the projection lens 67 are returned to the respective positions shown in FIG. 5.

The light modulator 66 is served by a sub-display panel originally mounted on mobile phones, i.e., the sub-display panel is made pivotable and thus usable also as the light modulator 66. In general, many of foldable mobile phones have a sub-display panel that is subsidiary to the main display panel to display various pieces of information such as the calling party's name and telephone number when there is an incoming call or the sender's name and e-mail address when receiving an e-mail. In this embodiment, a transmissive liquid crystal display panel is used as the sub-display panel and arranged so that the same display image as that on the main display panel appears on this panel, whereby it is used as a light modulator for image projection.

The transmissive liquid crystal display panel is of the same specifications as that used in the first embodiment, i.e. the specifications of an active matrix liquid crystal display panel using TFTs. Further, the transmissive liquid crystal display panel is arranged to perform image display based on the field-sequential color method in which pixel electrodes thereof are driven synchronously with the light-emission drive of LED elements R, G and B of the LED device.

The projection lens 67 comprises a convex lens accommodated and secured in a holder casing. In this embodiment, a convex lens having a diameter of about 20 mm and a thickness of about 5 mm is used. If a transmissive liquid crystal display panel with a display screen having a diagonal measurement of about 15 mm is used, a projected image having a diagonal measurement of 350 mm is obtained on the projection screen.

Figure 8:
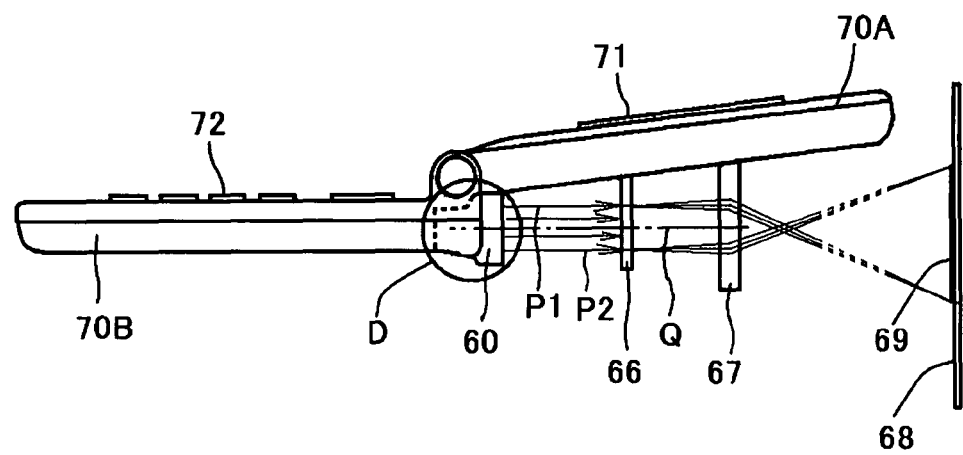
FIG. 8 is a side view schematically showing the way in which image projection is performed with the mobile phone shown in FIG. 5.
Figure 9:
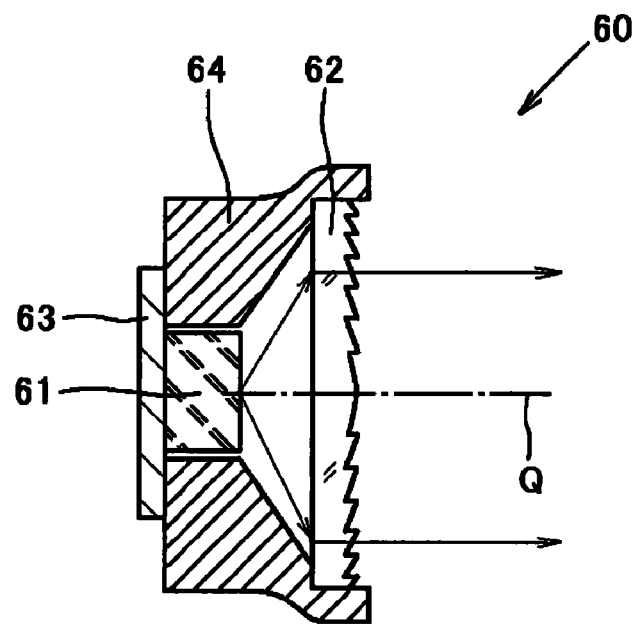
FIG. 9 is a fragmentary enlarged sectional view showing a light source section enclosed with circle D in FIG. 8.

The light source section 60 is, as shown in FIGS. 5, 6 and 8, mounted on an end surface of the second housing member 70B near the hinge 70C. The light source section 60 is provided so that illuminating light is emitted therefrom toward the transmissive liquid crystal display panel serving as the light modulator 66. As shown in FIG. 9, the light source section 60 has an LED device 61 mounted on an LED substrate 63 and a lens 62 that converts light emitted from the LED device 61 into substantially parallel rays. The LED device 61 and the lens 62 are accommodated in a light source housing 64.

The LED device 61 used in this embodiment has the same specifications as the LED device 31 used in the above-described first embodiment. That is, the LED device 61 has three different kinds of LED elements provided in one package. The LED elements have different luminous wavelengths from each other. The three different kinds of LED elements are, although not shown in the figure, an LED element R having a luminous wavelength in the red color region, an LED element G having a luminous wavelength in the green color region, and an LED element B having a luminous wavelength in the blue color region. The LED elements R, G and B are arranged to repeatedly turn on in the sequence of R→G→B with a time period of 5 ms or less per LED element. The pixel electrodes of the transmissive liquid crystal display panel serving as the light modulator 66 are driven synchronously with the sequential turning on-off of the LED elements R, G and B, thereby performing color image display based on the field-sequential color method in the same way as the drive specifications in the first embodiment.

The LED device 61 comprises three different kinds of the LED elements R, G and B that are accommodated in one package. In recent years, luminous efficiency of LED elements has been improved to attain brightness with a high luminance. Accommodating LED elements R, G and B in one package enables high-luminance red, green and blue light emission to be obtained with a single LED device. In comparison to a light source section formed by using three LEDs, i.e. an LED for red light, an LED for green light, and an LED for blue light, the light source section 60 can be reduced in size to a considerable extent because it needs only one LED device. The image projection mechanism can be provided on the mobile phone without impairing portability. In addition, the LED device 61 has a characteristic property that the on-off response time is fast. In this embodiment, image display based on the field-sequential color method is realized in synchronism with the drive of the light modulator 66 comprising a transmissive liquid crystal display panel by utilizing the characteristic property of the LED device 61 that the response time is fast. Image display based on the field-sequential color method provides a clear and bright multicolor display image.

As shown in FIG. 9, the lens 62 comprises a Fresnel lens that condenses light emitted from the LED device 61 into substantially parallel rays. The lens 62 is positioned where it can collect not less than 96% of light from the LED device 61. Substantially parallel rays formed through the Fresnel lens are directed to the light modulator 66. The LED device 61 is compact in size with three different kinds of LED elements R, G and B provided in a single LED device, and the Fresnel lens is thin in thickness. Accordingly, the light source section 60 can be reduced in size.

Projection of the image displayed on the light modulator 66 comprising a transmissive liquid crystal display panel is performed in a manner as shown in FIG. 8. The mobile phone is unfolded, and the LED device 61 in the light source section 60 provided on the end surface of the second housing member 70B is turned on. Light emitted from the LED device 61 is converted into substantially parallel rays through the lens 62 in the light source section 60 and directed toward the light modulator 66. The substantially parallel rays pass through the light modulator 66 and further through the projection lens 67 to reach a screen 68. Thus, an image displayed on the light modulator 66 is projected on the screen 68 as an enlarged projected image 69.

Because light emitted from the light source section 60 is applied to the light modulator 66 as parallel rays as stated above, divergence of light is reduced. Thus, the light utilization efficiency is increased, and the brightness of the projected image increases. In addition, because the divergence of image emitting light from the light modulator 66 reduces, the diameter of the projection lens 67 can be minimized. Accordingly, the space required for accommodating the image projection mechanism in the mobile phone can be reduced.

The light modulator 66 is supported and fixed at a position where the display surface thereof is substantially perpendicular to the optical axis Q of the light source section 60. The projection lens 67 is supported and fixed at a position where the optical axis thereof is substantially on the same line as the optical axis Q of the light source section 60 and where the projection lens 67 is in focus.

It should be noted that the projection light rays may be blocked by the first housing member 70A, depending on the relationship between the mount position of the projection lens 67, the size of the projected image and the distance from the projection lens 67 to the projected image. If such occurs, the position of the optical axis of the projection lens 67 relative to the center of the display surface of the light modulator 66 is slightly shifted downward (as viewed in FIG. 8) within a range in which the projection lens 67 can exhibit the desired performance, thereby enabling the desired image to be projected at a position where the projection light rays are not blocked by the first housing member 70A. That is, the center of the projected image is below the extension of the optical axis Q of the light source section 60. In this embodiment, the position of the line on which the optical axis of the projection lens 67 is placed substantially in line with the optical axis Q of the light source section 60 is defined as including the above-described position range.

In the third embodiment, the light source section 60 has the LED device 61 and the lens 62 comprising a Fresnel lens, which are accommodated in the light source housing 64. It is, however, also possible to use a polarization converter as employed in the second embodiment. That is, the light source section 60 may comprise the LED device 61, the lens 62 and the polarization converter, which are accommodated in the light source housing 64. The provision of the polarization converter produces advantageous effects that the light utilization efficiency is further increased and the projected image becomes brighter.

When the polarization converter is used, the total luminous flux is about 50 lm (lumen) in a case where the LED device 61 is formed from three different LED elements R, G and B and the LED elements R, G and B are turned on and off sequentially to form white light. If a transmissive liquid crystal display panel with a display area having a diagonal measurement of about 15 mm is used as the light modulator 66 and a lens having a diameter of about 20 mm and a thickness of about 5 mm is used as the projection lens 67, a projected image with an image area having a diagonal measurement of 350 mm can be obtained on the screen 68. A projected image of about 100 lx (lux) can be obtained. That is, it is possible to provide a sufficiently bright projected image that is satisfactorily visible in a room without interior illumination in the daytime. Electric power consumed by the LED device 61 is about 0.9 W. This power consumption allows image projection to be effected with the battery of the mobile phone, provided that the projection is not performed for a long period of time.

The mobile phone 70 enables the operator to perform the image projection operation while viewing the main display panel 71 and the operation panel 72. Moreover, the operator can perform the image projection operation with the mobile phone 70 held in one hand. Specifically, the operator can readily perform operations such as switching of projected images by using the operation panel 72.

It should be noted that although in FIG. 5 the projection lens 67 is depicted as being exposed, the projection lens 67 should preferably be protected with a protective cover or the like for the purposes of preventing scratching on the lens during carrying of the mobile phone and of preventing cracking or breaking of the lens due to impact. The protective cover is removed when the projection operation is to be performed.

In this embodiment, the light source section 60 has the LED device 61 and the lens 62 comprising a Fresnel lens, which are accommodated in the light source housing 64. The lens 62 is, however, not necessarily limited to a Fresnel lens. A convex condenser lens, a prism lens and the like are also usable as the lens 62.

Next, a mobile phone according to a fourth embodiment of the present invention will be described with reference to FIGS. 10 to 13.

Figure 10:
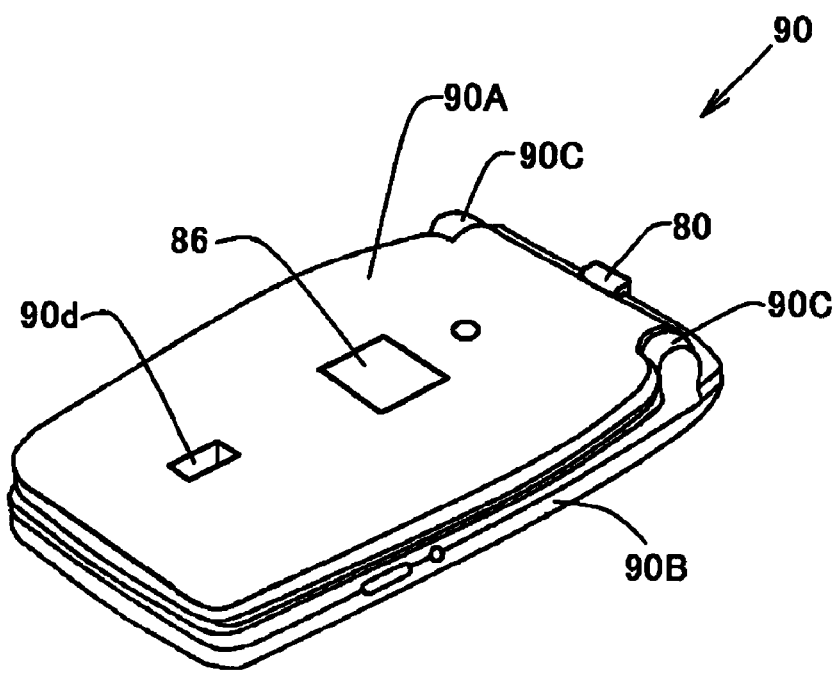
FIG. 10 is a perspective view of a mobile phone according to a fourth embodiment of the present invention, showing the mobile phone as folded.
Figure 11:
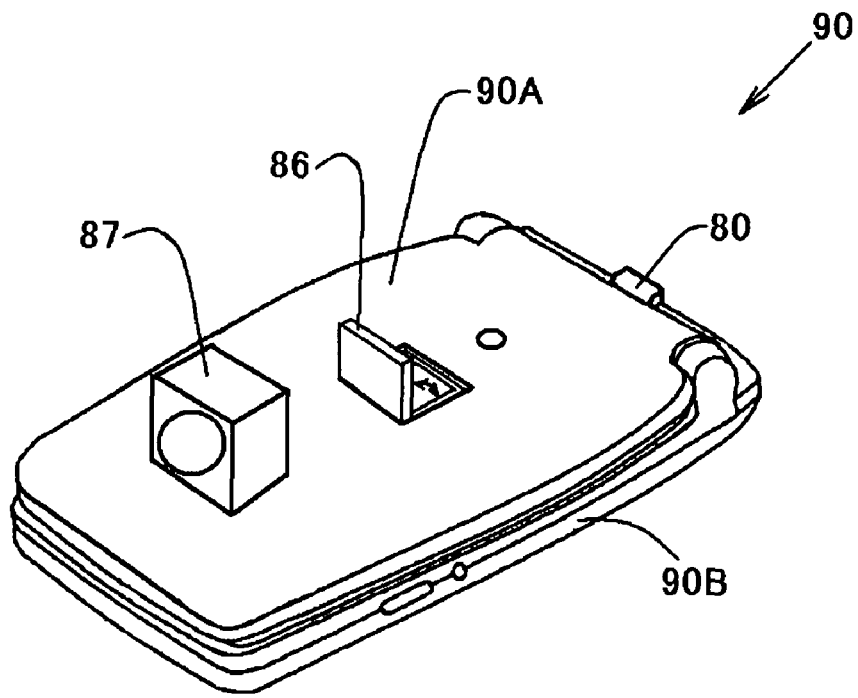
FIG. 11 is a perspective view of the mobile phone in FIG. 10, showing a state where a light modulator and a projection lens have been set in respective image projection positions.

A mobile phone 90 in this embodiment is a foldable mobile phone having a first housing member 90A and a second housing member 90B that are pivotable about a hinge 90C in the same way as the mobile phone in the foregoing third embodiment. As shown in FIGS. 10 and 11, the first housing member 90A has a light modulator X6 pivotably mounted thereon and is provided with a mount opening 90d so that a projection lens 87 can be detachably mounted on the first housing member 90A through the mount opening 90d. The light modulator 86 and the projection lens 87 are mounted on a side of the first housing member 90A opposite to a side thereof on which a main display panel 91 is provided. A light source section 80 having an LED device provided therein is attached to an end surface of the second housing member 90B near the hinge 90C.

Figure 12:
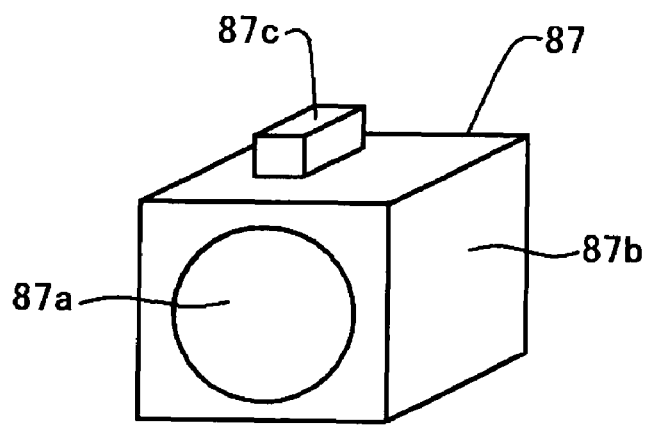
FIG. 12 is a perspective view of the projection lens shown in FIG. 11.

The mount opening 90d is configured such that a projection 87c of the projection lens 87, shown in FIG. 12, can be fitted into the mount opening 90d. The projection lens 87 is mounted on the first housing member 90A by fitting the projection 87c of the projection lens 87 into the mount opening 90d.

The light modulator 86 comprises a transmissive liquid crystal display panel in the same way as the light modulator in the third embodiment. The transmissive liquid crystal display panel as the light modulator 86 is pivotably attached to the first housing member 90A and adapted to serve also as a sub-display panel of the mobile phone as in the case of the third embodiment. The image projection mechanism is arranged such that the same display image as on the main display panel 91 appears on the sub-display panel, and this image is projected.

The projection lens 87 has a plurality of lens elements 87a provided in a holder casing 87b. The holder casing 87b is provided with the projection 87c. A part or all of the lens elements 87a are, although not shown in the figure, movable forward or backward in the holder casing 87b within a small range to adjust the size of the projected image and to focus it. The adjusting movement of the lens elements 87a is effected by a fine adjustment mechanism (not shown) provided on the projection lens 87.

The reason why a plurality of lens elements are used as the projection lens 87 is to obtain a large-sized projected image excellent in projection accuracy and image quality. The use of a plurality of lens elements increases the overall thickness of the projection lens 87 and makes it difficult to permanently mount it on the first housing member 90A of the mobile phone 90. Therefore, the projection lens 87 is formed separately from the first housing member 90A and adapted to be attachable and detachable with respect to the first housing member 90A.

When the mobile phone 90 is unfolded, the main display panel 91 on the first housing member 90A and an operation panel 92 on the second housing member 90B appear on the front side of the mobile phone 90. The main display panel 91 and the operation panel 92 are, respectively, of the same specifications as those used in the foregoing third embodiment. The light source section 80 has the same structure as that of the light source section 60 in the third embodiment. That is, the light source section 80 includes an LED device having LED elements R, G and B provided in one package. The LED device and a Fresnel lens are accommodated in a housing to constitute the light source section 80. Light emitted from the LED device is converted into substantially parallel rays through the lens and projected through the light modulator 86 and the projection lens 87. The light emitting timing of the LED elements R, G and B of the LED device and the image display timing on the transmissive liquid crystal display panel serving as the light modulator 86 are synchronized with each other to perform multicolor image display based on the field-sequential color method.

Figure 13:
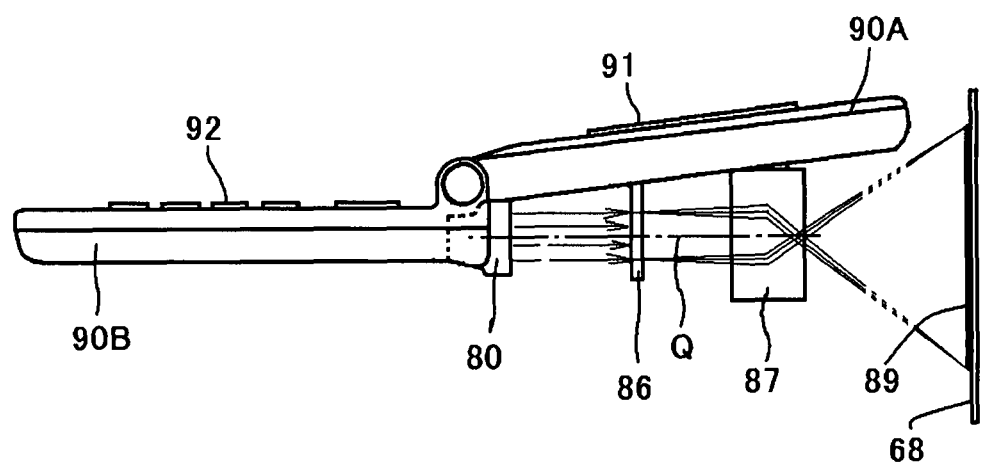
FIG. 13 is a side view schematically showing the way in which image projection is performed with the mobile phone shown in FIG. 10.

When image projection is to be performed, as shown in FIG. 13, the light modulator 86 comprising a transmissive liquid crystal display panel is fixed at a position where the display surface thereof is substantially perpendicular to the optical axis Q of the light source section 80, and the projection lens 87 is fixed at a position where the optical axis thereof is substantially on the same line as the optical axis Q of the light source section 80. The lens elements 87a in the projection lens 87 are moved forward or backward along the optical axis Q of the light source section 80 by actuating the fine adjustment mechanism provided on the projection lens 87 to adjust the size of an image 89 projected on the screen 68 and to effect focusing so that the projected image 89 looks clear and sharp.

The image projection mechanism in this embodiment is characterized, as compared to the image projection mechanism in the third embodiment, in that the projection lens is formed in an easily detachable structure so that a large-sized lens or a plurality of lens elements can be used as the projection lens to obtain a clear and bright, enlarged projected image. The constituent components of the image projection mechanism other than the projection lens are of the same specifications as those used in the third embodiment. Therefore, the same advantageous effects as explained in connection with the third embodiment can be obtained.

When the image projection operation is not performed, the projection lens 87 is removed, and the light modulator 86 is folded. The mobile phone in this state can be used in an ordinary manner. There is substantially no impairment of portability.

Although in the fourth embodiment the projection 87c provided on the projection lens 87 is fitted into the mount opening 90d of the first housing member 90A to secure the projection lens 87, it should be noted that the projection lens securing structure is not necessarily limited to the described structure. Another publicly known securing structure may be adopted. For example, an L-shaped hook structure may be employed.

Further, the light source section 80 in the fourth embodiment is constructed according to the same specifications as the light source section in the third embodiment. The light source section 80 may, however, be of the same specifications as the structure used in the second embodiment. That is, the light source section 80 may have the specifications of a light source section having an LED device, a lens, and a polarization converter that are accommodated in a light source housing.

When the image projection operation is not performed, the mount opening 90d of the first housing member 90A may be closed with a cover, e.g. a plug or stopper, to prevent entry of contaminants.

Figure 14:
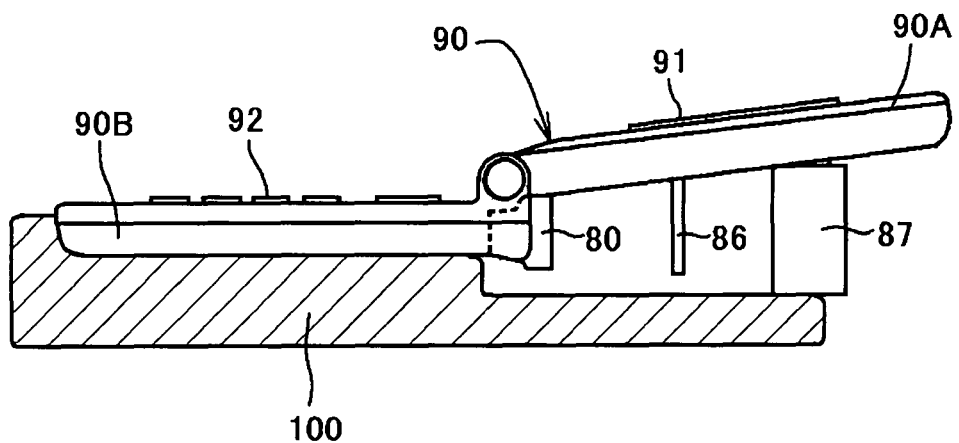
FIG. 14 is a side view for explaining the way of performing image projection using the mobile phone shown in FIG. 10.
Figure 15:
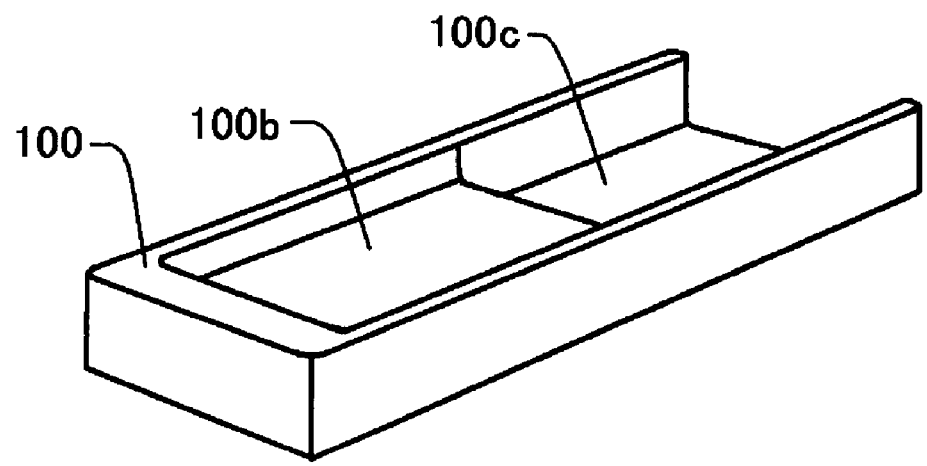
FIG. 15 is a perspective view of a mobile phone battery charger shown in FIG. 14.
Figure 16:
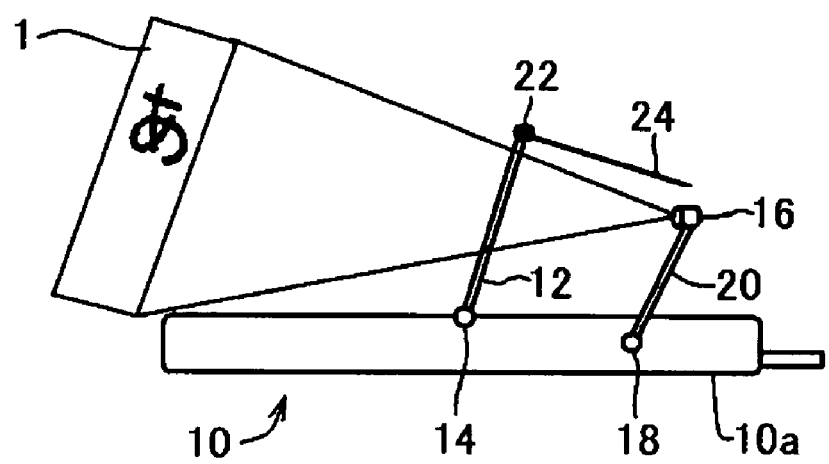
FIG. 16 is a side view of a conventional mobile phone adapted to be usable as a projector.

FIG. 14 shows the way in which image projection is performed with the mobile phone 90 mounted on a mobile phone battery charger 100. As shown in the figure, the second housing member 90B of the mobile phone 90 is adapted to be easily detachably attached to the mobile phone battery charger 100 to supply electric power from the battery charger 100 to the mobile phone 90. As shown in FIG. 15, the battery charger 100 is provided with two recesses 100b and 100c. The recess 100b is adapted to accommodate and secure the second housing member 90B of the mobile phone 90. The recess 100c is adapted to accommodate the light modulator 86, the projection lens 87 and so forth. The depth and width of the recess 100c are so set that the battery charger 100 will not block projection light. It should be noted that the battery charger 100 is provided with connecting terminals (not shown). The connecting terminals are connected to connecting terminals provided on the second housing member 90B as set on the battery charger 100 to supply electric power to the mobile phone 90. The battery charger 100 preferably has a detachable mechanism with a spring-action retaining mechanism, for example, so that the second housing member 90B is easily attachable and detachable. Because the second housing member 90B can be set in such a way that the operation panel 92 and the main display panel 91 face upward, the projection operation can be performed without any adverse influence on operability.

The mobile phone battery charger 100 is suitable for use when image projection is performed for a long period of time, or in a case where the image projection area is increased and the illuminance of the image reduces in inverse proportion to the image projection area.

Recently, it has been made possible to display a personal computer's display screen or a television broadcast screen on the display panel of a mobile phone. The mobile phone according to the present invention can be used as a compact data projector for such a personal computer or television broadcast screen by supplying electric power from the mobile phone battery charger and using an external projection lens for large-area image projection.

It should be noted that the present invention is not necessarily limited to the foregoing embodiments but can be modified in a variety of ways without departing from the gist of the present invention.

What is claimed is:

1. A mobile phone comprising:
a light source section for image projection including a light-emitting diode device that has three different kinds of light-emitting diode elements provided in one package and having different luminous wavelengths from each other to be turned on and off sequentially;
a light modulator that operates synchronously with the sequential turning on and off of the light-emitting diode elements to project a multicolor image;
a projection lens;
a lens that collects light emitted from the light-emitting diode device and directs the light toward the light modulator;
a first housing member having a first surface, a second surface opposite to the first surface, and an end surface extending between the first surface and second surface, the first housing member having a main display panel on the first surface; and
a second housing member having a first surface, a second surface opposite to the first surface, and an end surface extending between the first surface and second surface, the second housing member having an operation panel on the first surface, and the second housing member having the first housing member that is pivotally attached to the second housing member such that the end surface of the first housing member is adjacent to the end surface of the second housing member, and the first housing member is displaceable to be pivoted between a folded position where the first surface of the first housing member abuts against the first surface of the second housing member and an unfolded position where the first surface of the first housing member is separate from the first surface of the second housing member,
wherein the light source section is attached to the end surface of the second housing member to emit light in a direction away from the second housing member and in a direction substantially parallel to the first surface and second surface of the second housing member, and
wherein the light modulator and the projection lens are attached to the first housing member and configured to be erectable on the second surface of the first housing member when the first housing member is placed in the unfolded position so that a light-receiving surface of the light modulator is substantially perpendicular to an optical axis of light from the light source section and an optical axis of the projection lens is substantially on a same line as the optical axis of light from the light source section.

2. The mobile phone according to claim 1, wherein the light modulator is a liquid crystal display panel, and the light source section has a polarization converter that converts polarization of light emitted from the lens to conform to a polarization property of the liquid crystal display panel.

3. The mobile phone according to claim 2, wherein the lens is a condenser lens that condenses light emitted from the light-emitting diode device into substantially parallel rays.

4. The mobile phone according to claim 3, wherein the three different kinds of light-emitting diode elements have luminous wavelengths in a red color region, in a green color region and in a blue color region.

5. The mobile phone according to claim 4, wherein the condenser lens is a Fresnel lens.

6. The mobile phone according to claim 1, wherein the light modulator is a transmissive liquid crystal display panel.

7. The mobile phone according to claim 1, wherein the light modulator serves also as a sub-display panel for the mobile phone that is provided on the second surface of the first housing member.

8. The mobile phone according to claim 1, wherein the second housing member is configured to be set in a mobile phone battery charger to receive electric power from the mobile phone battery charger so that when the first housing member is placed in the unfolded position and the second housing member is set in the mobile phone battery charger, it is possible to perform image projection while operating the operation panel on the second housing member and receiving electric power from the mobile phone battery charger.

9. A mobile phone comprising:
a light source section for image projection including a light-emitting diode device that has three different kinds of light-emitting diode elements provided in one package and having different luminous wavelengths from each other to be turned on and off sequentially;
a light modulator that operates synchronously with the sequential turning on and off of the light-emitting diode elements to project a multicolor image;
a projection lens;
a lens that collects light emitted from the light-emitting diode device and directs the light toward the light modulator;
a first housing member having a first surface, a second surface opposite to the first surface, and an end surface extending between the first surface and second surface, the first housing member having a main display panel on the first surface; and
a second housing member having a first surface, a second surface opposite to the first surface, and an end surface extending between the first surface and second surface, the second housing member having an operation panel on the first surface, and the second housing member having the first housing member pivotally attached to the second housing member such that the end surface of the first housing member is adjacent to the end surface of the second housing member, and the first housing member is displaceable to be pivoted between a folded position where the first surface of the first housing member abuts against the first surface of the second housing member and an unfolded position where the first surface of the first housing member is separate from the first surface of the second housing member,
wherein the light source section is attached to the end surface of the second housing member to emit light in a direction away from the second housing member and in a direction substantially parallel to the first surface and second surface of the second housing member,
wherein the light modulator is attached to the first housing member and configured to be erectable on the second surface of the first housing member when the first housing member is placed in the unfolded position so that a light-receiving surface of the light modulator is substantially perpendicular to an optical axis of light from the light source section, and
wherein the projection lens is attachable and detachable with respect to the second surface of the first housing member and configured so that when the projection lens is attached to the second surface and the first housing member is placed in the unfolded position, an optical axis of the projection lens can be set substantially on a same line as the optical axis of light from the light source section.

10. The mobile phone according to claim 9, wherein the light modulator is a transmissive liquid crystal display panel.

11. The mobile phone according to claim 9, wherein the light modulator serves also as a sub-display panel for the mobile phone that is provided on the second surface of the first housing member.

12. The mobile phone according to claim 9, wherein the second housing member is configured to be set in a mobile phone battery charger to receive electric power from the mobile phone battery charger so that if the first housing member is placed in the unfolded position and the second housing member is set in the mobile phone battery charger, it is possible to perform image projection while operating the operation panel on the second housing member and receiving electric power from the mobile phone battery charger.

13. The mobile phone according to claim 9, wherein the light modulator is a liquid crystal display panel, and the light source section has a polarization converter that converts polarization of light emitted from the lens to conform to a polarization property of the liquid crystal display panel.

14. The mobile phone according to claim 13, wherein the lens is a condenser lens that condenses light emitted from the light-emitting diode device into substantially parallel rays.

15. The mobile phone according to claim 14, wherein the three different kinds of light-emitting diode elements have luminous wavelengths in a red color region, in a green color region, and in a blue color region.

16. The mobile phone according to claim 15, wherein the condenser lens is a Fresnel lens.

* * * * *